United States Patent
Clark et al.

(10) Patent No.: US 10,084,496 B2
(45) Date of Patent: *Sep. 25, 2018

(54) INTERFERENCE SIGNAL CANCELLATION OVER A BROAD FREQUENCY RANGE

(71) Applicant: Resonant Sciences, LLC, Dayton, OH (US)

(72) Inventors: Randall T. Clark, Beavercreek, OH (US); Nathan Thomas Kornbau, Beavercreek, OH (US); Jeremy Micah North, Dayton, OH (US)

(73) Assignee: Resonant Sciences, LLC, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,861

(22) Filed: May 22, 2017

(65) Prior Publication Data

US 2017/0264327 A1  Sep. 14, 2017

Related U.S. Application Data

(63) Continuation of application No. 15/401,703, filed on Jan. 9, 2017, now Pat. No. 9,692,469.

(60) Provisional application No. 62/298,496, filed on Feb. 23, 2016.

(51) Int. Cl.
  *H04B 1/12* (2006.01)
(52) U.S. Cl.
  CPC ..................... *H04B 1/12* (2013.01)
(58) Field of Classification Search
  CPC .......... H04B 1/12; H04B 1/123; H04B 1/126; H04B 1/1063; H04B 1/1054
  USPC ................................ 375/316, 346, 349, 350
  See application file for complete search history.

(56) References Cited

U.S. PATENT DOCUMENTS

| | | | |
|---|---|---|---|
| 4,878,251 A | 10/1989 | Richardson | |
| 4,989,262 A | 1/1991 | Saito | |
| 7,555,219 B2 | 6/2009 | Cox et al. | |
| 8,503,926 B2 | 8/2013 | Gainey et al. | |
| 8,755,750 B2 | 6/2014 | Cox et al. | |
| 8,868,006 B2 | 10/2014 | Cox et al. | |
| 9,209,840 B2 | 12/2015 | Cox | |

(Continued)

OTHER PUBLICATIONS

A. Carusone; D.A. Johns; "Analogue Adaptive Filters: Past and Present"; IEE Proc.—Circuits Devices System., vol. 147, No. 1,; pp. 82-90; Feb. 2000.

*Primary Examiner* — Siu Lee
(74) *Attorney, Agent, or Firm* — Christopher M. Ramsey; GrayRobinson, P.A.

(57) ABSTRACT

A signal interference cancellation system includes a signal filter that receives an interference signal and is in communication with a receiver that also receives the interference signal. The signal filter includes (a) a modulation system that modulates the interference signal to generate a modulated signal, (b) a first frequency range within which the modulation system amplifies quadrature components of the modulated signal, (c) a second frequency range within which the modulation system amplifies non-quadrature components of the modulated signal, and (d) a signal adder that combines the amplified quadrature and non-quadrature components of the modulated signal from (b) and (c) to generate an interference cancellation signal. The signal filter communicates the interference cancellation signal to the receiver for cancelling the interference signal.

21 Claims, 6 Drawing Sheets

(56) References Cited

U.S. PATENT DOCUMENTS

| | | | |
|---|---|---|---|
| 9,692,469 B1 * | 6/2017 | Clark | H04B 1/12 |
| 9,781,612 B2 * | 10/2017 | Buskgaard | H04B 17/12 |
| 2004/0032904 A1 | 2/2004 | Orlik et al. | |
| 2004/0151238 A1 * | 8/2004 | Masenten | H04B 1/123 |
| | | | 375/219 |
| 2013/0163482 A1 * | 6/2013 | Suzuki | H04B 1/0057 |
| | | | 370/273 |

* cited by examiner

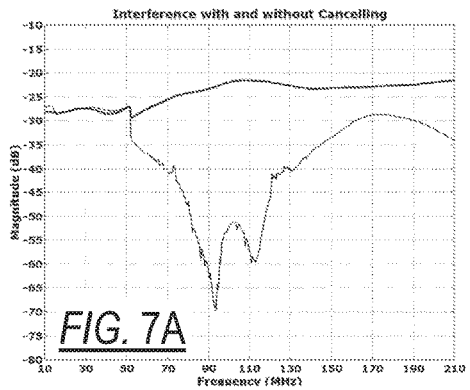
30 dB Cancellation from 80 to 120 MHz
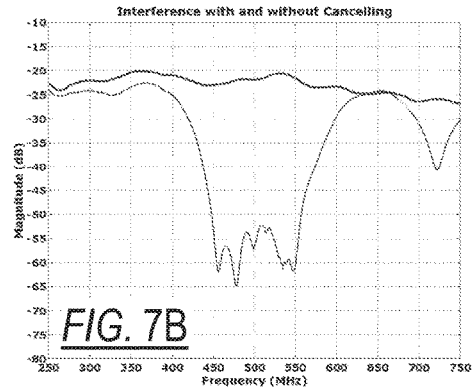
30 dB Cancellation from 450 to 550 MHz
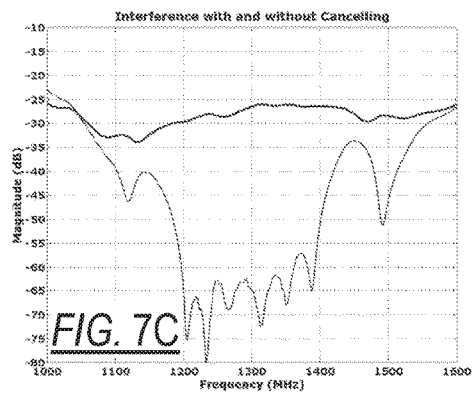
30 dB Cancellation from 1200 to 1400 MHz
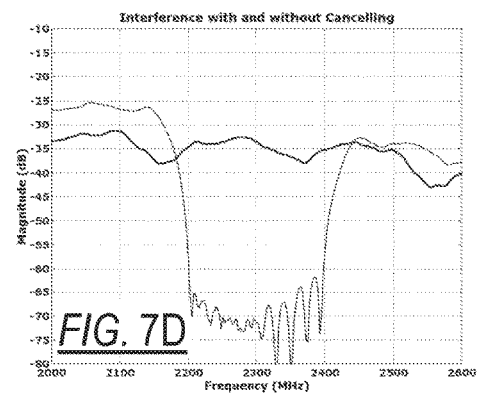
30 dB Cancellation from 2200 to 2400 MHz
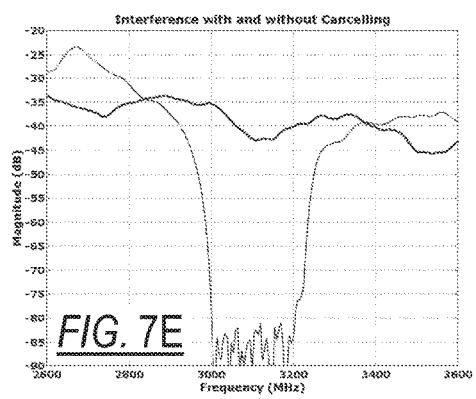
45 dB Cancellation from 3000 to 3200 MHz
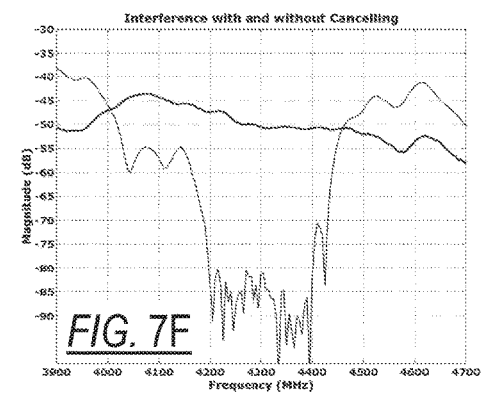
35 dB Cancellation from 4200 to 4400 MHz

INTERFERENCE SIGNAL CANCELLATION OVER A BROAD FREQUENCY RANGE

CROSS-REFERENCE TO RELATED APPLICATION

This application is a continuation of U.S. application Ser. No. 15/401,703, filed Jan. 9, 2017 which itself claims priority from U.S. provisional Application No. 62/298,496, filed Feb. 23, 2016, which is hereby incorporated by reference in its entirety.

FIELD

This relates to the field of RF devices and, more particularly, to reducing signal interference between RF devices.

BACKGROUND

Wireless signals are typically transmitted in the radio frequency ("RF") range of the electromagnetic spectrum. Because there are so many RF signals travelling through the air at any given time, RF devices are equipped with electronics that can allow them to separate the desired signals from the RF noise and interfering signals. But distinguishing the desired signal from the noise and interfering signals can be difficult if the two signals are close or identical in frequency.

Ships and aircraft often include many different RF devices, including RADAR and radios, which serve different functions. Unfortunately, because these devices operate over the same or similar frequency ranges and because they are in close proximity to each other, they can be difficult, and sometimes impossible, to use simultaneously. When a transmit antenna is located near a receive antenna, the signal sent from the transmit antenna interferes with the signal the receive antenna is supposed to intercept, making the receive signal noisy.

Many schemes have been developed to reduce interference between nearby antennas, including using specialized electronic interference canceller. Conventional electronic interference cancellers, however, are only able to cancel signals over a narrow frequency range with a narrow instantaneous bandwidth.

SUMMARY

In view of the foregoing, it would be advantageous to provide a signal canceller that has a broader operational frequency range and a broader instantaneous bandwidth than conventional electronic interference cancellers. Conventional modulation-based electronic interference cancellers only amplify quadrature components of the modulated signal. The system described here has a broader operational frequency range and instantaneous bandwidth because it modulates the interference signal and amplifies both quadrature and non-quadrature components of the modulated signal.

In an exemplary method of cancelling signal interference an interference signal received by a receiver is passed through a signal filter that at least partially cancels the interference signal using a modulation system. The modulation system (a) modulates the interference signal to generate a modulated signal, (b) amplifies quadrature components of the modulated signal within a first frequency range, and (c) amplifies non-quadrature components of the modulated signal within a second frequency range. An interference cancellation signal is formed from a combination of the amplified quadrature components from (c) and the amplified non-quadrature components from (d). The interference cancellation signal is provided to the receiver for cancelling the interference signal.

An exemplary signal interference cancellation system includes a signal filter that receives an interference signal and is in communication with a receiver that also receives the interference signal. The signal filter includes (a) a modulation system that modulates the interference signal to generate a modulated signal, (b) a first frequency range within which the modulation system amplifies quadrature components of the modulated signal, (c) a second frequency range within which the modulation system amplifies non-quadrature components of the modulated signal, and (d) a signal adder that combines the amplified quadrature and non-quadrature components of the modulated signal from (b) and (c) to generate an interference cancellation signal. The signal filter communicates the interference cancellation signal to the receiver for cancelling the interference signal.

An exemplary method of reducing interference in an RF communication system includes generating an interference cancellation signal by passing an interference signal received by a receiver through (i) an RF tapped delay line having a first tap and a second tap, (ii) a first modulator that receives a first input signal from the first tap, and (iii) and a second modulator that receives the second input signal from the second tap. Both of the first modulator and second modulator amplify quadrature components and non-quadrature components of the respective input signal by imparting signal weights to the quadrature components and non-quadrature components. The interference cancellation signal is provided to the receiver for cancelling the interference signal.

An exemplary RF signal filter includes an RF tapped delay line having a first tap and a second tap separated by a delay line having a characteristic RF signal delay time. A first modulator receives a first input signal from the first tap and a second modulator that receives a second input signal from the second tap. Both of the first modulator and second modulator include (i) a first frequency range within which the respective modulator amplifies quadrature components of the input signal and (ii) a second frequency range within which the respective modulator amplifies non-quadrature components of the input signal. A signal adder combines an output signal from the first and second modulators.

The following are optional features that may be included in the examples above.

The quadrature components of the modulated signal are 90 degrees out of phase with each other and the non-quadrature components of the modulated signal are not 90 degrees out of phase with each other.

A 90 degree RF coupler may be used. The 90 degree RF coupler separates the modulated signal into the quadrature components within the first frequency range and separates the modulated signal into the non-quadrature components within the second frequency range.

The receiver may receive the interference signal at an antenna that also generates the interference signal.

The signal filter may impart separate signal weights to the quadrature and non-quadrature components of the modulated signal.

BRIEF DESCRIPTION OF THE DRAWINGS

FIG. 7A is a graph of experimental measurements of signal cancellation between 10 MHz and 210 MHz.

FIG. 7B is a graph of experimental measurements of signal cancellation between 250 MHz and 750 MHz.

FIG. 7C is a graph of experimental measurements of signal cancellation between 1000 MHz and 1600 MHz.

FIG. 7D is a graph of experimental measurements of signal cancellation between 2000 MHz and 2600 MHz.

FIG. 7E is a graph of experimental measurements of signal cancellation between 2600 MHz and 3600 MHz.

FIG. 7F is a graph of experimental measurements of signal cancellation between 3900 MHz and 4700 MHz.

DETAILED DESCRIPTION OF EXAMPLE EMBODIMENTS

Figure 1:
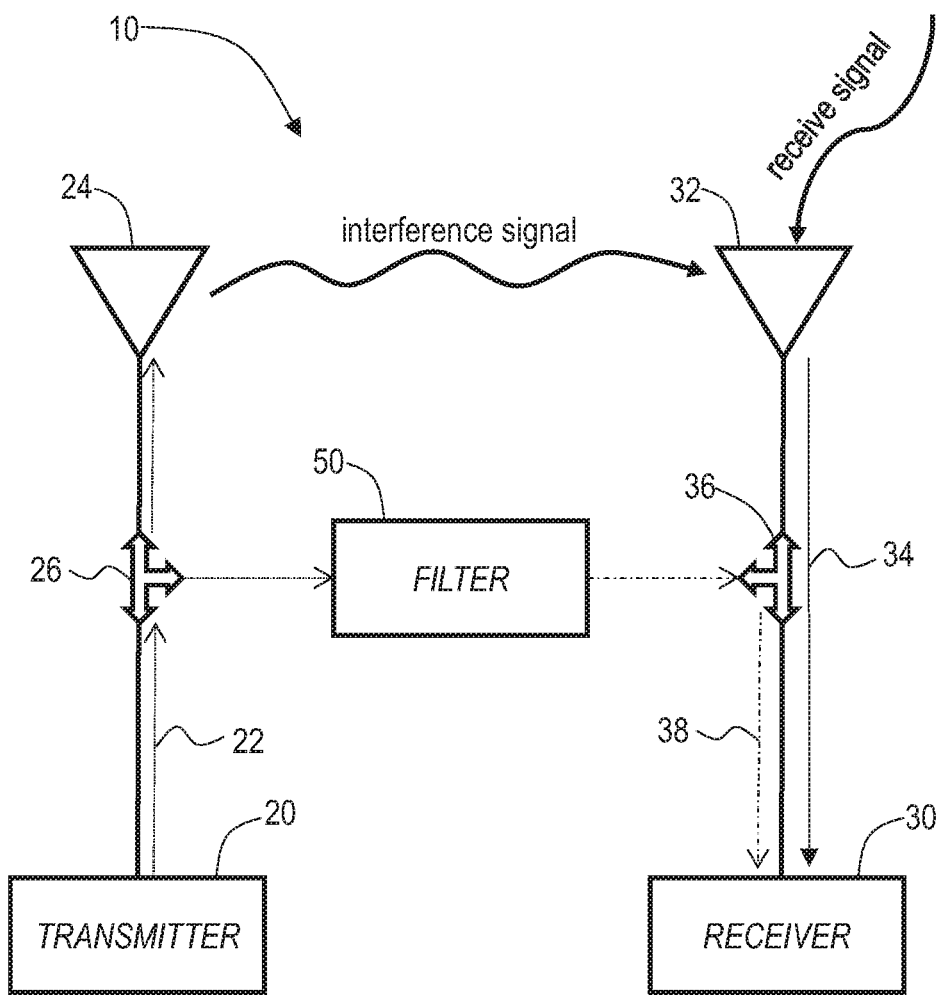
FIG. 1 is block diagram of an example of a signal cancellation system operating on nearby antennas.

An example of the signal cancellation system 10 is generally shown in FIG. 1. The system 10 includes a transmitter 20 that generates a transmit signal that is transmitted by a transmit antenna 24. The system also includes a receiver 30 that is designed to receive a receive signal 34 at a receive antenna 32. The problem with interference arises when the receiver antenna 32 also receives the transmit signal, which is shown in FIG. 1 as the interference signal. Because the receiver antenna 32 receives both the receive signal 34 and the interference signal, the total signal that reaches the receiver 30 is the combination of both.

The interference signal is cancelled by using a first directional coupler to split the transmit signal 22 into two portions: one that passes to the transmit antenna 24 and another that passes through a filter 50. A filtered transmit signal 38 exits the filter 50 and is combined with the receive signal 34 at a second direction coupler 36. The filtered transmit signal 38 is used to subtract the interference signal from the receive signal 34.

Figure 2:
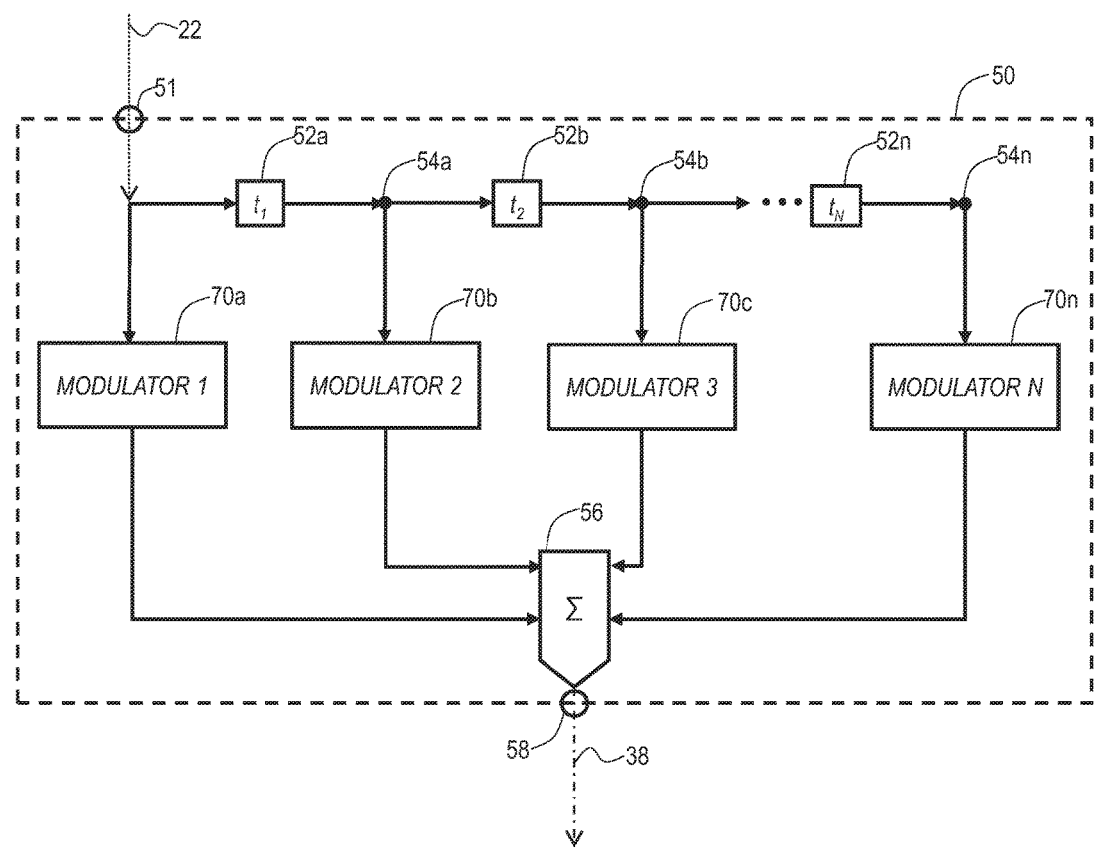
FIG. 2 is a block diagram of an example of a signal cancelling filter that may be used in the signal cancellation system.

Details of the filter 50 are now described by referring to FIG. 2. The filter 50 functions like an analog tapped delay line filter. The filter 50 includes a transmit signal input port 51 receives the transmit signal 22. The transmit signal is passed through a plurality of tapped delay lines having a plurality of sequentially positioned taps 54 separated by delay times 52. The taps 54 feed a portion of the transmit signal 22 to a plurality of modulators 70. In the example shown, the letters (a,b,c . . . n) after the reference numerals 52, 54, and 70 illustrate that the filter may have any number of delay times 52, taps 54, and modulators 70. The number of taps will correspond to the number of sampling points used to cancel the interference signal. The signals exiting the modulators 70 are combined in a signal adder 56, which outputs the filtered transmit signal 38 from an output port 58.

Figure 3:
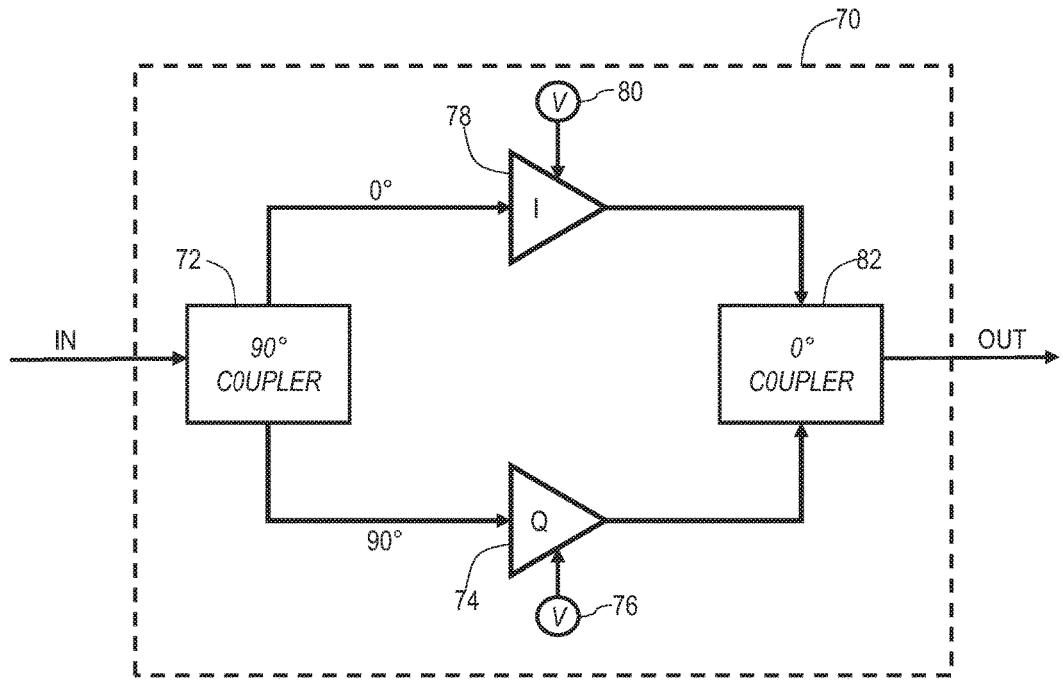
FIG. 3 is a block diagram of an exemplary modulator used in the filter.

Details of an exemplary modulator 70 are now described by referring to FIG. 3. The modulator 70 is an IQ modulator. When the modulator operates in its quadrature operational mode, an input signal is fed through a 90 degree coupler that splits the input signal into quadrature components: an in-phase component (I) and a quadrature component (Q) that are 90 degrees out of phase with each other. The respective weights of the I and Q components are adjusted, respectively, by an I-component amplifier 78 and a Q-component amplifier 74. Both of these amplifiers 74,78 are connected to a signal weight adjuster 76,80 such as a dual-polarity voltage controller. The signal weight adjuster 76,80 allows for adjustment of the weights or amplitudes of the I and Q components of the signal. The I and Q components of the signal exit the amplifiers 74, 78 and are combined at a signal combiner such as a two way 0 degree coupler 82.

In tests, the filter 50 had an operational range over which it could cancel an interference signal from 10 MHz to 6 GHz and it had an instantaneous bandwidth that ranged from 5 MHz to several hundred MHz. It was routinely capable of achieving 30 dB cancellation of the interference signal. This broad operational frequency range is possible because the modulator 70 weights signals outside of the normal quadrature operational frequency range of the 90 degree coupler.

90 degree couplers are only designed to separate quadrature signals into I and Q components over an octave bandwidth, such as 1-2 GHz for example. When the input RF signal is within the quadrature operational frequency range of the 90 degree coupler, the 90 degree coupler will divide the signal into true I and Q vector components that are 90 degrees out of phase, where the I-component is the real vector component and the Q component is the imaginary vector component. In this scenario, the modulator 70 functions as a true vector modulator. The I and Q component amplifiers 74,78 may be adjusted to apply a desired weight to each component by supplying different voltages with the signal weight adjuster 76,80.

Conventional wisdom would suggest that the operational bandwidth of modulator employing a narrow band 90 degree coupler would be no more than the operational bandwidth of the 90 degree coupler. In other words, if the 90 degree coupler can only separate a modulated signal into true 90 degrees out of phase IQ components between 1-2 GHz, one would not expect the modulator to work very well outside the 1-2 GHz range.

A particularly advantageous feature of the modulator 70 is that its operational bandwidth is much larger than the 90 degree coupler's 72 operational bandwidth. This is because the modulator 70 can also operate outside the frequency range in which the 90 degree coupler can separate quadrature signals into IQ components.

Outside the quadrature operational frequency range, it does not separate the input signal into true real and imaginary vector components; instead, it simply splits the input signal into two non-quadrature components that are not 90 degrees out of phase with each other.

Adjusting the weights of the two non-quadrature component signals via the I and Q component amplifiers 74,78 may still allow for interference signal cancellation both above and below the quadrature operational frequency range of the 90 degree coupler. By taking advantage of this functionality, the operational frequency range of the modulator 70 is expanded beyond what would be expected when using a conventional narrow-band 90 degree coupler.

Figure 4:
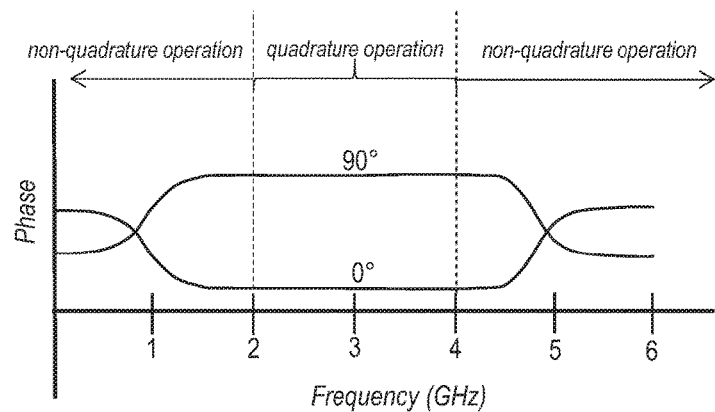
FIG. 4 is a graph illustrating the modulator I and Q channel phase vs frequency for a modulator that has a quadrature operational mode from 2-4 GHz.

FIG. 4 is an illustrative I and Q channel phase vs. frequency plot for a hypothetical modulator having a quadrature operational frequency range of 2-4 GHz.

Between 2-4 GHz, the I and Q channels receive the 0 degree and 90 degree components of the modulated input signal. Above and below this range, however, the modulator operates in its non-quadrature operational mode because the modulated signals that reach the I and Q channels are not 90 degrees out of phase.

Figure 5:
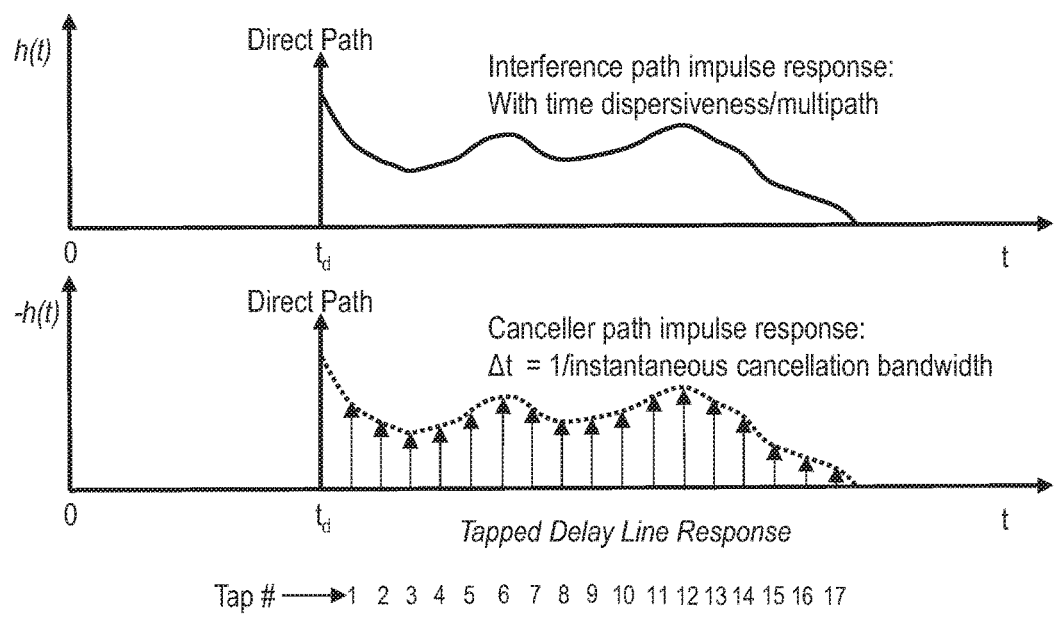
FIG. 5 is a set of graphs illustrating a method of cancelling signal interference. The upper panel is a graph of an interference path impulse response. The lower panel is a canceller path impulse response where a series of Nyquist samples are separated by a delay time to fit the interference path impulse response.

As illustrated in FIG. 5, the interference signal may be characterized by an impulse response that varies over time. The filter 50 generates a simulated time-dependent cancellation impulse response by fitting the true impulse response with a series of Nyquist samples that are separated by the delay time 52 in the tapped delay line. The simulated impulse response may be subtracted from the true impulse path response to substantially cancel the interference signal. The Nyquist samples are fitted by adjusting the I and Q component weights, whether they be from a quadrature component signal or a non-quadrature component signal.

Figure 6:
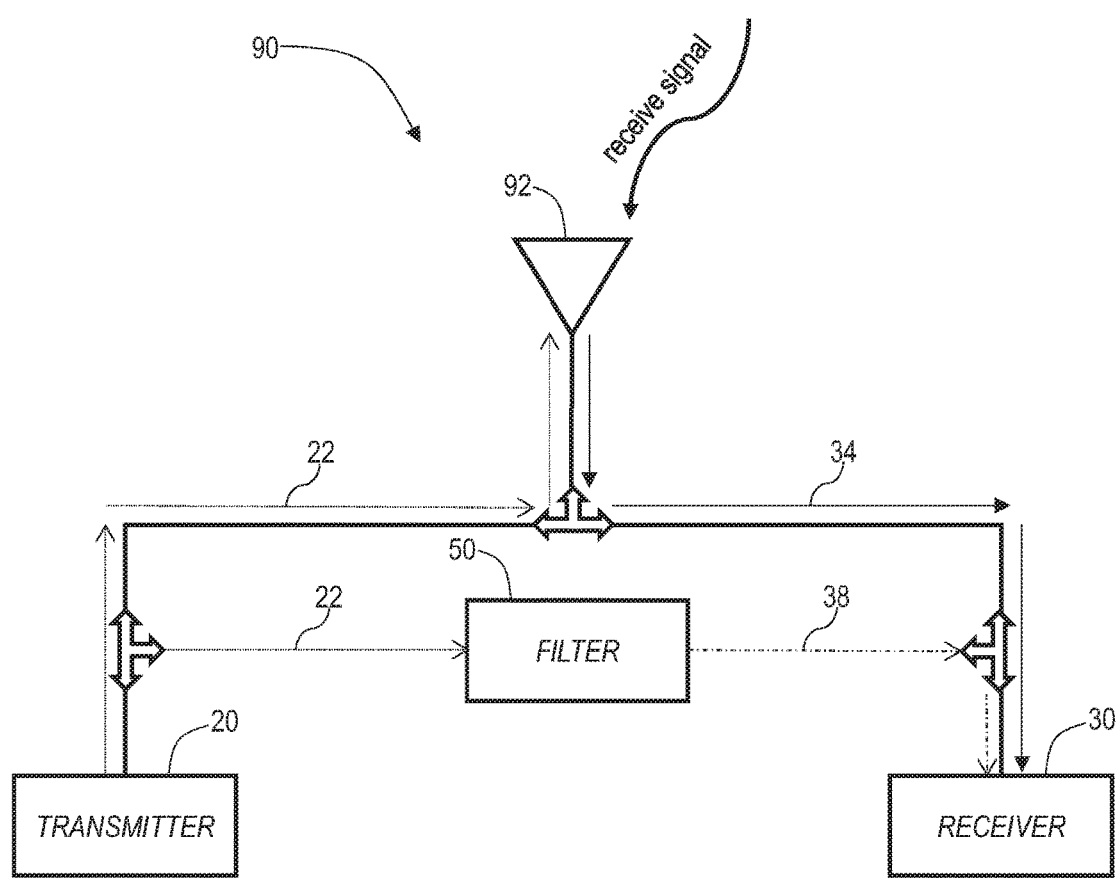
FIG. 6 is a block diagram of a single-antenna transmit and receive system, including the signal cancelling filter.

The filter 50 may also be used in conjunction with a single antenna system 90, such as simultaneous transmit and receive ("STAR") antenna as illustrated in FIG. 6. The single antenna system 90 includes a transmit/receive antenna 92 that transmits the transmit signal 22 and also receives the receive signal 34. This results in substantial RF interference between the transmit signal 22 and the receive signal.

The interference may be cancelled by feeding a portion of the transmit signal 22 to the filter 50 to create a filtered signal 38 as discussed above. The receiver 30 then receives a combination of the receive signal 34 and filtered signal.

Example

Interference Signal Cancellation Measurements

This example is provided to show that the filter can be used to cancel an interference signal over a broad operational bandwidth and with a wide instantaneous bandwidth. This example is provided by way of illustration and does not limit the scope of possible embodiments.

FIGS. 7A-F are a series of graphs that illustrate the functionality of the signal filter from 10 MHz to 4700 MHz. The bold line is a combination of the receive signal and interference signal. The narrower line is the received signal with the interference signal cancelled over an instantaneous bandwidth. The quadrature operational frequency of the 90 degree coupler was 1.7-2.7 GHz.

In FIGS. 7A and B, the filter operated in non-quadrature mode because the frequency was below the quadrature operational frequency of the 90 degree coupler. In FIG. 7A, the filter provided about 30 dB cancellation of the interference signal over about 50 MHz. In FIG. 7B, the filter provided about 30 dB cancellation of the interference signal over about 100 MHz.

In FIGS. 7C and D the filter operated in quadrature mode because the frequency was within the quadrature operational frequency of the 90 degree coupler. In FIG. 7C, The filter provided about 30 dB cancellation of the interference signal over about 200 MHz.

In FIG. 7D, the filter provided about 30 dB cancellation of the interference signal over about 200 MHz.

In FIGS. 7E and F, the filter operated in non-quadrature mode. In FIG. 7E, the filter provided about 45 dB cancellation of the interference signal over about 200 MHz. In FIG. 7F, the filter provided about 35 dB cancellation of the interference signal over about 200 MHz.

This example shows that over the range of 10 MHz to 4700 MHz, the filter was able to cancel the interference signal very well, regardless of whether it operates on a quadrature signal or non-quadrature signal.

This disclosure describes certain example embodiments, but not all possible embodiments of the RF signal cancelling system, filter, and associated methods. Where a particular feature is disclosed in the context of a particular embodiment, that feature can also be used, to the extent possible, in combination with and/or in the context of other embodiments. The signal cancelling system, filter, and associated methods may be embodied in many different forms and should not be construed as limited to only the embodiments described here.

That which is claimed is:

1. A method of filtering a signal, the method comprising:
    passing a first signal through a signal filter that at least partially cancels the first signal using a modulation system by:
    (a) amplifying quadrature components of an input signal associated with the first signal,
    (b) amplifying non-quadrature components of the input signal, and
    (c) combining the amplified quadrature components from (a) and the amplified non-quadrature components from (b).

2. The method of claim 1, wherein:
    the quadrature components of the input signal are 90 degrees out of phase with each other; and
    the non-quadrature components of the input signal are not 90 degrees out of phase with each other.

3. The method of claim 1, wherein the signal filter comprises a tapped delay line having a first tap and a second tap separated by a delay line having a characteristic RF signal delay time; and
    the modulation system includes a first modulator that receives an input signal from the first tap and a second modulator that receives an input signal from the second tap.

4. The method of claim 1, wherein the first signal is received at an antenna that also generates the first signal.

5. The method of claim 1, further comprising imparting separate signal weights to the quadrature and non-quadrature components of the input signal.

6. A signal filtering system comprising:
    a signal filter that receives a first signal and is in communication with a receiver that also receives the first signal, the signal filter comprising:
    (a) a modulation system that modulates the first signal, the modulation system being capable of amplifying quadrature components of an input signal associated with the first signal and amplifying non-quadrature components of the input signal, and
    (b) a signal adder that combines the amplified quadrature and non-quadrature components of the input signal from (a) to generate filtered first signal and that communicates the filtered first signal to the receiver.

7. The system of claim 6, wherein:
    the quadrature components of the input signal are 90 degrees out of phase with each other; and
    the non-quadrature components of the input signal are not 90 degrees out of phase with each other.

8. The system of claim 6, wherein the signal filter further comprises:
    a tapped delay line having a first tap and a second tap separated by a delay line having a characteristic RF signal delay time; and the modulation system includes a first modulator that receives an input signal from the first tap and a second modulator that receives an input signal from the second tap.

9. The system of claim 6, wherein the receiver receives the first signal at an antenna that also generates the first signal.

10. The system of claim 6, wherein the signal filter further includes a signal weight adjuster connected to modulation system, the signal weight adjuster being adapted to impart separate signal weights to the quadrature and non-quadrature components of the input signal.

11. A method of transmitting and receiving radio frequency (RF) signals, the method comprising:
   transmitting a transmit signal;
   receiving a receive signal;
   generating a filtered transmit signal including amplified quadrature and non-quadrature components of an input signal associated with the transmit signal; and
   cancelling interference caused by the transmit signal to the receive signal using the filtered transmit signal.

12. The method of claim 11, wherein the same antenna transmits the transmit signal and receives the receive signal.

13. The method of claim 11, wherein the transmit signal and receive signal have overlapping frequencies.

14. The method of claim 11, wherein the transmit signal is transmitted and the receive signal is received simultaneously.

15. The method of claim 11, wherein the quadrature components of the input signal are 90 degrees out of phase with each other and the non-quadrature components of the input signal are not 90 degrees out of phase with each other.

16. The method of claim 11, further comprising imparting separate signal weights to the quadrature and non-quadrature components of the input signal.

17. A radio frequency (RF) communications system comprising:
   a transmitter that generates a transmit signal;
   a signal filter that amplifies quadrature and non-quadrature components of an input signal associated with the transmit signal to produce a filtered transmit signal;
   a receiver in communication with the signal filter and that receives a receive signal; and
   a signal combiner that combines the filtered transmit signal with the receive signal.

18. The system of claim 17, further comprising an antenna that transmits the transmit signal and receives the receive signal.

19. The system of claim 17, wherein the transmitter and receiver transmit and receive at overlapping frequencies.

20. The system of claim 17, wherein the quadrature components of the input signal are 90 degrees out of phase with each other and the non-quadrature components of the input signal are not 90 degrees out of phase with each other.

21. The system of claim 17, the signal filter includes a signal weight adjuster adapted to impart separate signal weights to the quadrature and non-quadrature components of the input signal.

* * * * *